United States Patent [19]
Deter

[11] Patent Number: 5,892,556
[45] Date of Patent: Apr. 6, 1999

[54] PROCESS AND DEVICE FOR THE TRANSMISSION OF A LOW DIVERGENCE LIGHT BEAM INSERTED INTO AN OPTICAL FIBRE FOR THE ILLUMINATION OF PIXELS IN AN VIDEO IMAGE

[75] Inventor: Christhard Deter, Gera, Germany

[73] Assignee: LDT GmbH & Co. Laser-Display-Technologie KG, Gera, Germany

[21] Appl. No.: 973,733

[22] PCT Filed: Apr. 14, 1997

[86] PCT No.: PCT/EP97/01863

§ 371 Date: Nov. 24, 1997

§ 102(e) Date: Nov. 24, 1997

[87] PCT Pub. No.: WO97/41473

PCT Pub. Date: Nov. 6, 1997

[30] Foreign Application Priority Data

Apr. 26, 1996 [DE] Germany .................. 196 16 843.0

[51] Int. Cl.⁶ ........................................... H04N 5/66
[52] U.S. Cl. ................... 348/739; 348/744; 348/804; 349/30; 345/7
[58] Field of Search ...................... 345/7, 8, 9, 84; 340/815.4, 815.5; 348/804, 744, 739, 745; 359/196, 218, 159, 173; 349/8, 25, 26, 27, 28, 29, 30

[56] References Cited

U.S. PATENT DOCUMENTS 4,818,049  4/1989  Assenheim et al. .
4,823,402  4/1989  Brooks ............................... 359/159
4,868,361  9/1989  Chande et al. .
5,485,225  1/1996  Deter et al. ............................ 348/804

FOREIGN PATENT DOCUMENTS 41 05 719  9/1992  Germany .
43 24 848  3/1995  Germany .

*Primary Examiner*—Andrew I. Faile
*Assistant Examiner*—Ibrahim Mohamednur
*Attorney, Agent, or Firm*—McAulay Nissen Goldberg Kiel & Hand, LLP

[57] ABSTRACT

In a suggested process for the transmission of a light bundle which is provided for illuminating picture points of a video picture and has a divergence angle and beam diameter determined by the way in which the light bundle is generated, the light bundle being coupled into a light guide and coupled out with an optical system for bundling a transmitted light bundle exiting the light guide, a divergence angle for the light bundle exiting the light guide is adjusted, by means of the optical system, proportionally to the divergence angle given by the manner in which the light bundle is generated, wherein the proportionality factor is the ratio of the given beam diameter before being coupled into the light guide to the beam diameter of the light bundle emerging from the optical system. A video system for carrying out the process has a suitably dimensioned optical system.

12 Claims, 3 Drawing Sheets

PROCESS AND DEVICE FOR THE TRANSMISSION OF A LOW DIVERGENCE LIGHT BEAM INSERTED INTO AN OPTICAL FIBRE FOR THE ILLUMINATION OF PIXELS IN AN VIDEO IMAGE

BACKGROUND OF THE INVENTION a) Field of the Invention

The invention is directed to a process for the transmission of a light bundle which is provided for illuminating picture points of a video picture and has a divergence angle and beam diameter determined by the way in which the light bundle is generated, the light bundle being coupled into a light guide and coupled out with an optical system for bundling a transmitted light bundle exiting the light guide. The invention is further directed to a video system for carrying out the process with a light source for emitting a light bundle for illuminating picture points of a video picture, with a light guide for light transmission into which is coupled a transmitted light bundle with a divergence determined by the light source and with a given beam diameter, and with an optical system for bundling the transmitted light bundle.

b) Description of the Related Art

Video systems in which picture points are illuminated are known, for example, from DE 43 24 848 C1. In these video systems, at least one light bundle is deflected in a scanning pattern over a screen in accordance with a video standard as is known in television from the generation of pictures by means of an electron beam with the deflecting coils provided for scanning. The light bundle is intensity-modulated in a manner analogous to the above-mentioned electron beam in order to generate a gray value or color corresponding to the picture content for the individual picture points shown on the screen. Laser beams are customarily used as light bundles because they are parallel and also permit a high resolution even where there is a great distance between the screen and the scanning device.

It is proposed in DE 43 24 848 C1 to spatially separate the laser beam scanning arrangement behind the laser modulating device in the light propagation direction. This is advantageous for maintenance and/or for a particularly favorable dividing up of space in an especially compact laser video projection system. In addition, the use of a light waveguide is suggested for transmitting laser beams between the laser modulating device and the scanning device. Light-conducting fibers in which the light is guided in a sheathed core are especially known as light waveguides. Unwanted emergence of light from the core is prevented by means of total reflection between the core and cladding.

However, the high degree of parallelism of the coupled-in laser beam is eliminated in light-conducting fibers because of variable reflection between the core and cladding, so that the light emerging from the light-conducting fiber has a substantially higher divergence than the coupled-in laser beam. In order to reduce this divergence, it is further proposed in DE 43 24 848 C1 to provide an optical system behind the light-conducting fiber in the light propagation direction, which optical system parallelizes the light bundle exiting from the light-conducting fiber.

In spite of this, it has been shown that, in practice, the light bundle which is parallelized in this way has inferior beam characteristics compared with the light that is coupled into the light-conducting fiber. Complete parallelism cannot be achieved.

However, for a high-resolution video picture, especially for the impending HDTV standards, a small divergence is required in order that the laser light spot which substantially determines the picture point size is so small on the screen that it corresponds to the required line resolution. As was shown in the foregoing discussion, the divergence is greatly increased when a light-conducting fiber is used. Although it could also be attempted to focus the coupled-out laser beam on the screen rather than parallelize it, it would be necessary to surrender the advantage resulting from a virtually parallel light beam, namely that a sharp picture is always obtained without changing the focussing conditions when the distance between the screen and scanning device changes. This advantageous characteristic of a virtually parallel light bundle for illuminating picture points allows a sharp picture to be shown on objects of any shape, for example, which is impossible with other projectors.

Transmission within light-conducting fibers also has a decisive influence especially on the mode structure of the laser beam because the single-mode structure of the laser is resolved into a plurality of modes when multimode light-conducting fibers are used. According to the teaching of DE 43 24 848 C1, it would be possible to parallelize an individual mode of the occurring modes; however, the other modes would then be expanded, so that for the entirety of the light bundle emanating from the light-conducting fibers there would be no resolution suitable for high-resolution video pictures.

Further, according to DE 43 24 848 C1, a collecting lens whose focal point coincides with the center of the light exit face is arranged at the light exit face of the light waveguide. Accordingly, it is achieved in theory that the point of the light exit face containing the optical axis of the collecting lens is imaged in infinity. However, since the light exit face of the light waveguide has a finite extension, parallelism cannot be achieved for the propagation condition of the laser light which exits over the entire cross-sectional surface of the light waveguide, for example, also in the vicinity of the cladding of a light-conducting fiber. Even the imaging of laser beams emerging parallel to the optical axis by means of the lens can also sharply decrease the achievable resolution due to the light bundle which is expanded by this lens and which strikes the screen.

OBJECT AND SUMMARY OF THE INVENTION

The primary object of the invention is to improve the generic process and the video system known from the prior art in such a way that a higher resolution can be achieved because of a virtually parallel light bundle for displaying pictures in spite of transmission by a light guide.

This object is met in a process in which a divergence angle for the light bundle exiting the light guide is adjusted by means of the optical system proportionally to the divergence angle given by the manner in which the light bundle is generated, wherein the proportionality factor is the ratio of the given beam diameter before being coupled into the light guide to the beam diameter of the light bundle emerging from the optical system. Further, a generic video system is characterized according to the invention in that the optical system is arranged at a location relative to the light guide and has a defined focal length at which and by which a divergence angle for the light bundle exiting the light guide is proportional to the divergence angle given by the light source, wherein the proportionality factor is the ratio of the beam diameter given by the light source to the beam diameter of the light bundle emerging from the optical system.

As is shown in practice, this condition can also be met in all of the various modes generated by the light guide.

According to the invention, the light bundle emanating from the light guide is not parallelized. In contrast to the prior art, a divergence angle is not only permitted, but is even required. This also contradicts the view that a small focussing point is self-evidently expected in the case of a parallel light bundle at very great distances as is conventional in the video system mentioned above. In contrast, the invention is based on the insight that, even without light guides, only a limited picture point size determined on the basis of the divergence of the light bundle given by expansions in the beam generation could be achieved and this picture point size cannot be improved.

As the result of a divergence—albeit a small divergence—which already occurs when the beam is generated, the divergence cannot possibly be improved via the light guides and the subsequent optical system because the Lagrange invariant whose fundamental importance in optics is recognized does not allow for optional improvement of focus when there already exists divergence due to light generation.

Also, from the vantage point of quantum mechanics, when considering a plurality of photons in a phase-space volume and taking into account the universally valid Liouville theorem, on the basis of which the particle number population of the phase-space volume is retained, it is clear that an optionally improved focussing at any location is only possible to the extent allowed by the initial conditions. Therefore, it could be supposed that by means of the configuration of the optical system by which the light bundle is coupled out of the light guide according to a given divergence which is identical to that of the coupled-in light bundle, the focussing is optimal. The phase-space population of photons in the pulse space then remains the same, regardless of whether or not the spatial proportion of the phase space is changed by the light guides. This supposition has been proven correct in experiments. Such considerations apply not only to light-conducting fibers, but also to other light waveguides, e.g., light-conducting rods, or cylinders with reflecting cylindrical surfaces, so that the invention can be transferred to all light guides.

However, these considerations which are directed exclusively to divergence only apply when the spatial proportion of the phase volume remains the same, that is, when the diameter of the incident beam is identical to the diameter of the exiting beam. By generalizing with the aid of the Lagrange invariant for defining the divergence of the coupled-in light bundle, it can be stated that the radiation products of the beam diameter and divergence angle should be identical in the coupled-in light bundle and in the coupled-out light bundle. As a result of manufacturing tolerances or interferences in light propagation in the light path, the sought for identity cannot always be achieved in practice. However, it has been shown that when the radiation product of the transmitted and coupled-out light bundle amounts to up to twice the coupled-in light bundle, a sufficiently high parallelizing of the coupled-out light bundle can be achieved.

Based on DE 43 24 848 C1, it would be conceivable to use an optical system in which a first lens system is given by the collecting lens mentioned in this patent and in which a second lens system of negative power is subsequently provided, by which the divergence required according to the invention is adjusted. An optical system of this kind could even contain an afocal system whose focal point is theoretically at a distance of infinity.

However, a more practical video system is provided according to an advantageous further development of the invention in which the optical system has positive power and its object-side focal point is located at the output of the light guide in the region of the core. Accordingly, lenses are advantageously economized on in contrast with the systems mentioned above by way of example. In the extreme case, when color correction can be dispensed with, a simple collecting lens is sufficient in accordance with this further development.

According to a preferred further development of the invention, the optical system is so arranged with reference to the axis of the light guide that the optical axis of the optical system extends vertically to the output-side core surface of the light guide and proceeds centrically from the core surface, and the optical system has an object-side principal plane whose position is given by the intersection of the optical axis with a straight connecting line proceeding from the core circumference and extending at a divergence angle of the light bundle coupled out of the light guide relative to the optical axis.

This arrangement is particularly advantageous since it not only ensures that the light bundle proceeding from the center of the core has the divergence required by the invention, but the light beams proceeding from the entire surface of the core of the light guide are transformed by the optical system into corresponding light beams with the divergence required according to the invention. This is understandable when the optical system is considered as an individual lens in which the principal plane indicates the lens position; because, in this case, the partial beam of the light bundle coupled out of the light guide at a divergence angle and proceeding from the circumference of the core is identical to the center beam through this lens and, because of the indicated construction, has precisely the required divergence.

The foregoing considerations have primarily concerned the pulse component of the phase-space volume. However, particularly favorable ratios with respect to intensity are obtained when all photons in the phase space of the coupled-in light beam are transmitted by the light guide. According to an advantageous further development of the invention in this respect, the light guide in this case has a core diameter dk and an aperture A associated therewith for the light expansion, whose product from dk and A is equal to the product of the divergence angle measured in radians and the diameter of the coupled-in light bundle of given divergence.

This can be derived from the principle of maintaining the population of the phase-space volume, wherein, however, the sine of the divergence angle would be made equal to the angle in radians because of the small divergence. The principle used here is also known from the sine condition or, in the special case of near-axis beams, as obtaining the radiation product in accordance with the Lagrange invariant.

In principle, this selection of the light guide according to the further development also allows the total intensity of the incident light bundle on the input side to be coupled into the light guide. The complete coupling in of the light bundle into the light guide will be considered in more detail hereinafter.

On the other hand, if only a portion of the coupled in light bundle, for example, the portion passed by a diaphragm which may possibly be provided, or if a portion of a light bundle with a larger diameter than the core in the light guide is transmitted through the light guide, a correspondingly equivalent diameter, e.g., such as the diameter of the diaphragm or the diameter of the core of the light guide, must be used in the aforementioned relationship for selecting the light guide, instead of the actual diameter of the coupled-in light bundle.

As is clear from the preceding statements, an optimum transmission of the light bundle substantially depends on the aperture of the light guide. It has been shown in particular that the invention can be realized most advantageously when the aperture of the light guide is between 0.05 and 0.15 and the core diameter of the light guide is between 10 μm and 30 μm. In this respect, it should be provided in particular that the aperture has a value of 0.1, wherein the light guide has a core diameter of 15 μm.

The distance of the optical system from the light guide can also not be selected optionally, which primarily affects the focal length since the focal point should lie in the vicinity of the core. A very large distance from the output of the light guide would result in very large lenses; a very small distance complicates adjustment or alignment. A distance given by the focal length of the optical system is selected in an optimum manner in accordance with a preferred further development of the invention in which the optical system of positive power has a focal length in the range of 15 mm to 25 mm and, in particular, has a value of 20 mm.

As was already indicated above, the laser light bundle generated by the light source is advisably coupled into the light guide in its entirety. This can be achieved, according to a preferred further development of the invention, in that an additional optical system is provided for coupling the light bundle into the light guide.

A particularly good coupling in is obtained especially according to a preferred further development of the invention when the additional optical system focusses the coupled in light bundle of given divergence centrally on the core of the light guide, wherein the diffraction-limited focus diameter of the additional optical system generated on the core is less than or equal to two thirds of the core diameter. Further, a particularly advantageous coupling in is provided, according to a preferable further development of the invention, when the optical axis of the additional optical system extends at the input of the light guide vertical to the core diameter and concentric to the core. A partial loss through diffraction or direct reflection between the core and cladding from the light guide is substantially prevented as a result of this further development.

BRIEF DESCRIPTION OF THE DRAWINGS

The invention is explained in principle more fully hereinafter by way of example with reference to the drawings.

DESCRIPTION OF THE PREFERRED EMBODIMENTS

Figure 1:
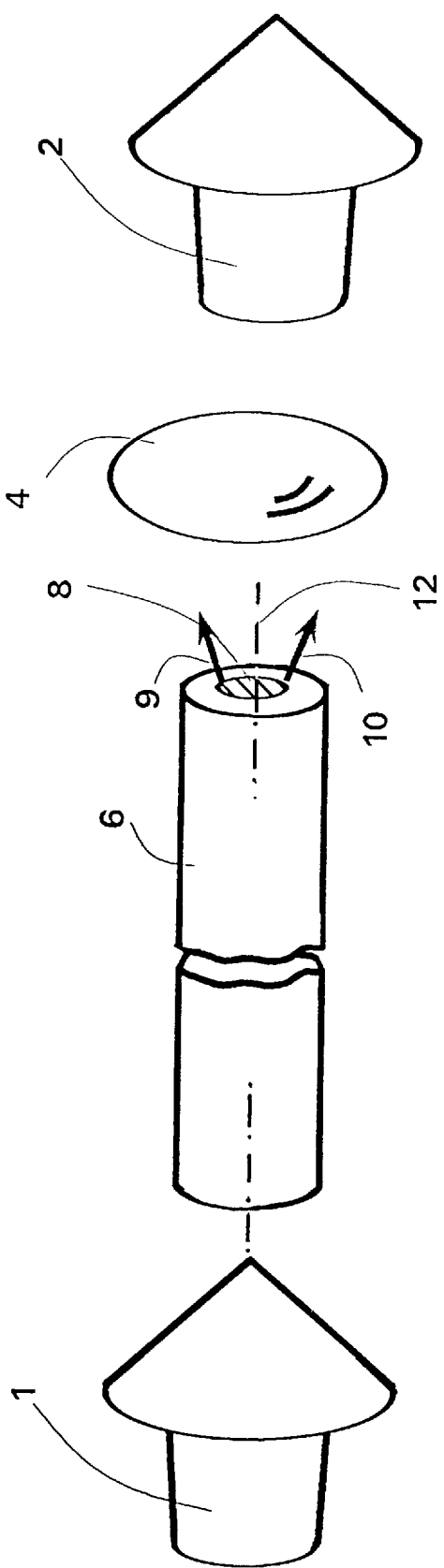
FIG. 1 shows a schematic view of an embodiment example of the invention.

Before the individual embodiment examples are discussed, the principle underlying the invention will be illustrated schematically in greater detail with reference to FIG. 1.

In FIG. 1, the incident light bundle is indicated by an arrow 1 shown in perspective and the emerging light bundle is indicated by another arrow 2. The shafts of the arrows 1 and 2 are shaped like truncated cones to indicate the divergence of the incident light bundle and the emerging light bundle. As can be seen from the schematic view in FIG. 1, the shafts of the arrows 1 and 2 have the same inclination to illustrate that the emerging light bundle (arrow 2) has the same angle of divergence as the incident light bundle (arrow 1).

Further, the incident light bundle and the emergent light bundle indicated in this schematic view should have the same diameter. That is, the radiation product of the angle of divergence and the beam diameter in the emergent light bundle is equal to that of the incident light bundle. Hereinafter, the following remarks will always refer to the same beam diameter of the incident light bundle and emergent light bundle. When the beam diameter changes due to optical systems situated in the beam path, the divergences mentioned hereinafter are to be adapted in principle to the same radiation products.

This identity of divergence with the same beam diameter is ensured by the optical system 4 which is configured in a suitable manner and is arranged with reference to the output of a light-conducting fiber 6. Further, a light-guiding core 8 is indicated in the light-conducting fiber 6. The arrows 9 and 10 illustrate the maximum divergence angle of an emerging light bundle.

Further, an optical axis 12 of the light-conducting fiber 6 extending concentrically to the core 8 and vertically from the core exit face is shown in the schematic drawing in FIG. 1 as a dash-dot line which coincides on the output side with the optical axis of the optical system 4 and on the input side with the optical axis of the incident light bundle designated by arrow 1.

The light-conducting fiber 6 which is shown in an interrupted view illustrates only the details of the light transmission arrangement on the input side and output side. Naturally, in practice, the ends of the light guide 6 are rotated and/or displaced relative to one another.

FIG. 1 indicates, by way of arrow 1, that a light bundle of small divergence is coupled into the light-conducting fiber 6. Due to the reflections between the core and the cladding of the light-conducting fiber 6, the transmitted light bundle is expanded as is indicated by arrows 9 and 10.

According to the prior art mentioned in the introductory part, the light bundle emerging from the light-conducting fiber 6 was to be parallelized by means of the optical system 4. In contrast, according to the invention, the optical system 4 is so configured, also especially with respect to its distance from the light-conducting fiber 6, that the light bundle indicated by arrow 2 obtains the same divergence as the coupled-in light bundle which is shown schematically by arrow 2. The identity of the divergences is indicated schematically in FIG. 1 by the same truncated-cone-shaped form of the arrows 1 and 2.

Figure 3:
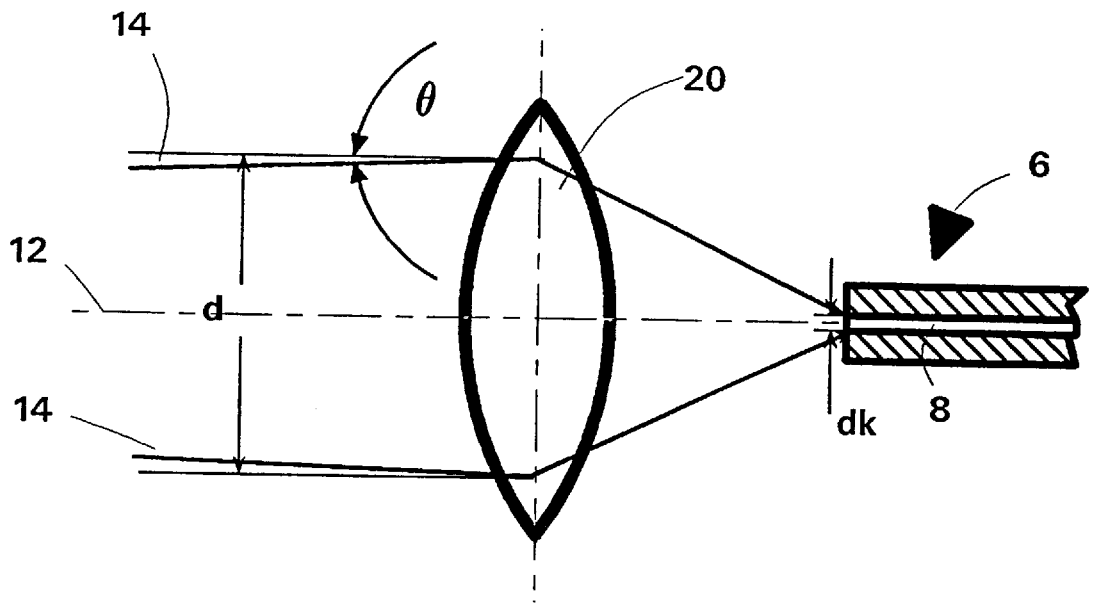
FIG. 3 shows a geometrical arrangement of an additional optical system for coupling into a light-conducting fiber.

The coupled-in light bundle can be directed directly on the core 8 of the optical fibers 6. As a rule, however, the diameter of laser beams which can be used in video systems is normally substantially greater than cores of light-conducting fibers 6, so that the light bundle shown schematically by arrow 1 is also coupled into the light-conducting fiber 6 by an additional optical system, of which an embodiment example is shown in FIG. 3.

First, however, the geometric ratios on the output side of the light-conducting fiber 6 and of the optical system 4 will be discussed more fully with the aid of FIG. 2.

The optical system 4 is shown here as an individual lens for the sake of simplicity. However, in special arrangements, for example, for color correction, an optical system comprising a plurality of lenses, an achromatic lens, is used for color correction. The plane, designated by H in FIG. 2, of the optical system 4 shown as a lens is then the object-side principal plane and the image-side principal plane at the same time.

Figure 2:
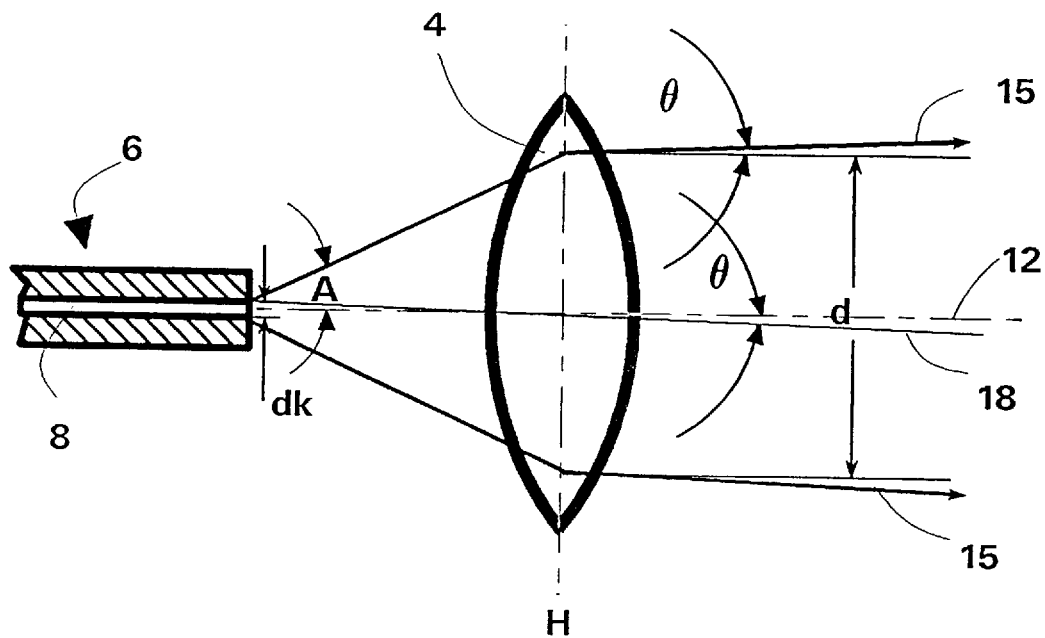
FIG. 2 shows a schematic view in section to illustrate the geometry of an embodiment example with an optical system.

In FIG. 2, the divergence of the emerging beam is indicated by the divergence angle θ. The divergence angle θ is the angle between the optical axis and the straight line from the edge point of the fiber core through the intersection of H with the optical axis. This is to be adjusted by way of the configuration of the optical system 4 so as to be equal to the divergence angle θ of the coupled-in beam of small divergence 14 shown in FIG. 3.

In the embodiment example, the optical system 4 was so configured with respect to its focal length that the light bundle emerging from the light-conducting fiber 6 at angle A passing through the optical system 4 in the emergent light bundle 15 defined by arrows exits with the same divergence angle θ as the coupled-in light bundle 14. The angle A designates the aperture which occurs in the embodiment examples as an angle, since the light-conducting fiber in the embodiment example had an aperture at small values between 0.05 and 0.15, especially 0.1, for which reason the sine of the angle which conventionally describes the aperture can be made approximately equal to the angle expressed in radians. The above-mentioned relationships are true for air (refractive index=1) and the above-mentioned aperture values refer to the angle of the light bundle emerging in air. In other media or manufacturer's specifications of light guides relating to other materials, the radiation product to be taken into account for all of the statements made herein is always to be understood as the product of the refractive index, beam diameter and diameter.

Keeping in mind the condition of constant radiation product, the light-conducting fiber 6 was so selected than its product of the aperture and core diameter equals the divergence θ of the coupled-in beam 14 multiplied by the diameter d of the beam which is coupled into the light-conducting fiber (FIG. 3). Since the entire light bundle according to FIG. 3 is coupled into the light-conducting fiber 6 via another optical system 20, the condition of constant radiation product also applies to coupling in. As a result, the light bundle 15 used for video projection which emerges from the light-conducting fiber 6 has, in practice, the same divergence as the beam emerging from the source in this embodiment example with the coupling in of the light bundle 14 via the additional optical system 4. This advantageous characteristic also results when a multimode fiber is used, since the maintaining of the radiation product is valid regardless of the mode structure.

The above-mentioned aperture values of 0.05 to 0.15 refer to diameters of a light-conducting fiber of 10 μm to 30 μm, especially 15 μm.

A further characteristic of the optical system 4 follows from FIG. 2. This optical system 4 is arranged with its object-side principal axis H at a location in which a straight line 18 emanating from the circumference of the core 8 at an angle of inclination θ to the optical axis 12 intersects the optical axis 12. The light beam of the light bundle exiting from the light-conducting fiber 6, which light beam emerges along the straight line 18, then proceeds through the center of the principal plane H of the optical system 4 at an inclination θ to the optical axis 12; that is, a beam emerging from the circumference of the core 8 also has the same divergence as a near-axis light beam emerging from the light-conducting fiber 6. The optical system 4 accordingly images at least approximately all of the light beams emanating from the core 8 into the emerging light bundle 15. The entire surface region of the core 8 is accordingly uniformly transformed via the optical system 4. The light bundle 15 therefore has substantially the same optical characteristics with respect to parallelism and diameter as the incident light bundle 14.

It should be expected that the same considerations with respect to the radiation product would also have to be taken into account when the light bundle 14 is coupled into the light-conducting fiber 6 due to the reversibility of the light path. It has been shown that it is just as advantageous to place the input surface of the core 8 in the focal point of the additional optical system 20 and to dimension the optical system 20 in such a way that the diffraction-limited focus of the light bundle 14 on the core 8 is less than or approximately two-thirds of the core diameter dk. Reflections and losses at the core cladding surface of the light-conducting fiber 6 are substantially avoided so as better to ensure that the incident light bundle 14 is completely coupled into the light-conducting fiber 6.

In the embodiment example, simple lenses with a focal length of 20 mm were used for the optical systems 4 and 20. However, optical systems 4 and 20 with focal lengths between 15 and 25 mm are also especially suitable.

Figure 4:
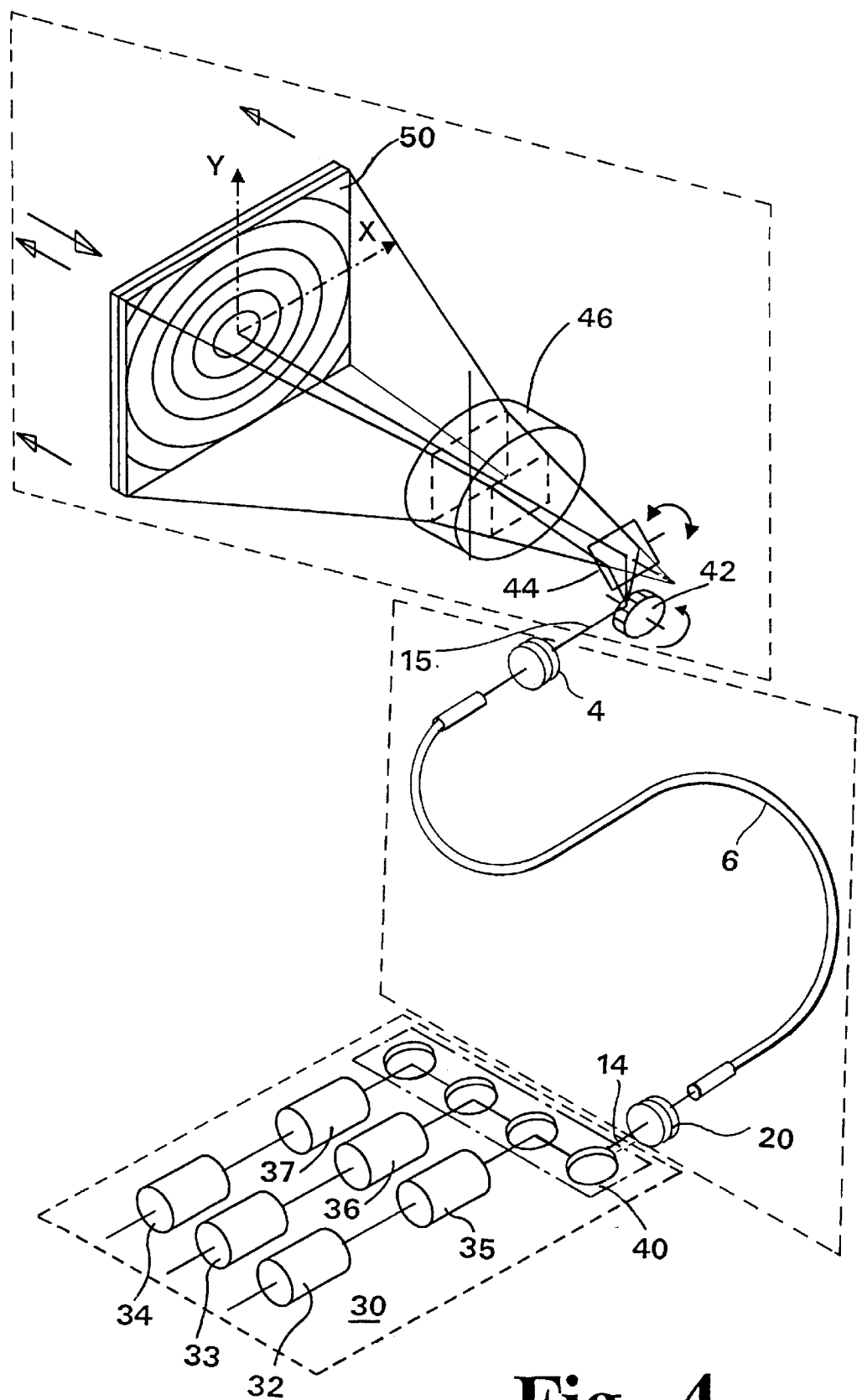
FIG. 4 shows an arrangement for a video projection system in which a light-conducting fiber is used in combination with an optical system.

FIG. 4 shows the use of a light bundle according to the invention coupled out of the light-conducting fiber 6 in a video projection device. This video projection device is described more fully in DE 43 24 848 C1 so that a more detailed description is not required herein. A first component group 30 comprises three lasers 32, 33, 34 whose emerging light bundles are intensity-modulated via modulators 35, 36 and 37. The light bundles emerging from the modulators 35, 36, 37 are combined via a mirror system 40 to form an individual light bundle 14 which is coupled into the light-conducting fiber 6 via an optical system 20. The optical system 4 described above serves to couple out; the emerging light bundle 15 proceeding from this optical system 4 is projected onto a scanning device comprising a polygon mirror 42 and a swivelling mirror 44, is deflected in a scanning pattern by the latter and made visible, via transforming optics 46, on a screen 50 as a video picture for an observer sitting in the direction indicated by the arrow.

In this example, a multimode fiber is used for transmitting three light bundles of different wavelengths. However, the principle shown in FIG. 1 to FIG. 3 can also be applied for monomode fibers, wherein an individual light-conducting fiber 6 with optical systems 4 and 6 for transmission is associated with each laser beam of different wavelength in a color video system. The mirror system 40 for combining the light bundles is then first arranged behind the optical systems 4 which are required in each instance and which follow the respective light-conducting fibers.

While the foregoing description and drawings represent the present invention, it will be obvious to those skilled in the art that various changes may be made therein without departing from the true spirit and scope of the present invention.

What is claimed is:

1. In a process for the transmission of a light bundle which is provided for illuminating picture points of a video picture and has a divergence angle and beam diameter determined by the way in which the light bundle is generated, the light bundle being coupled into a light guide and coupled out with an optical system for bundling a transmitted light bundle exiting the light guide, an improvement comprising the step of:

adjusting a divergence angle for the light bundle exiting the light guide by means of the optical system, proportionally to the divergence angle given by the manner in which the light bundle is generated, wherein the proportionality factor is the ratio of the given beam diameter before being coupled into the light guide to the beam diameter of the light bundle emerging from the optical system.

2. A video system for carrying out a process for the transmission of a light bundle which is provided for illuminating picture points of a video picture and having a divergence angle and beam diameter determined by the way in which the light bundle is generated, said video system comprising:

a light source for emitting a light bundle for illuminating picture points of a video picture;

a light guide for light transmission into which is coupled a transmitted light bundle with a divergence determined by the light source and with a given beam diameter; and an optical system for bundling the transmitted light bundle;

said optical system being arranged at a location relative to the light guide and having a defined focal length at which and by which a divergence angle for the light bundle exiting the light guide is proportional to the divergence angle given by the light source, wherein the proportionality factor is the ratio of the beam diameter given by the light source to the beam diameter of the light bundle emerging from the optical system.

3. The video system according to claim 2, wherein the optical system has positive power and its object-side focal point is located at the output of the light guide in the region of the core.

4. The video system according to claim 3, wherein the optical axis of the optical system extends vertically to the output-side core surface of the light guide and proceeds centrically from the core surface, and the optical system has an object-side principal plane (H) whose position is given by the intersection of the optical axis with a straight connecting line proceeding from the core circumference and extending at a divergence angle ($\theta$) of the light bundle coupled out of the light guide relative to the optical axis.

5. The video system according to claim 2, wherein the light guide has a core diameter dk and an aperture A associated therewith for light expansion, whose product from dk and A is equal to the product of the divergence angle ($\theta$) measured in radians and the diameter of the coupled-in light bundle of given divergence.

6. The video system according to claim 2, wherein the aperture of the light guide is between 0.05 and 0.15 and the core diameter dk of the light guide is between 10 $\mu$m and 30 $\mu$m.

7. The video system according to claim 6, wherein the aperture has a value of 0.1 and the light guide has a core diameter of 15 $\mu$m.

8. The video system according to claim 5, wherein the optical system has positive power and a focal length in the range of 15 mm to 25 mm.

9. The video system according to claim 8, wherein the focal length is 20 mm.

10. The video system according to claim 2, wherein an additional optical system is provided for coupling the light bundle into the light guide.

11. The video system according to claim 10, wherein the additional optical system focusses the coupled-in light bundle of given divergence centrally on the core of the light guide, wherein the diffraction-limited focus diameter of the additional optical system generated on the core is less than or equal to two thirds of the core diameter (dk).

12. The video system according to claim 10, wherein the optical axis of the additional optical system extends at the input of the light guide vertical to the core diameter and concentric to the core.

* * * * *